United States Patent
Manicke et al.

(10) Patent No.: US 8,899,939 B2
(45) Date of Patent: Dec. 2, 2014

(54) PROCESS FOR PRODUCING A CERAMIC MATRIX COMPOSITE ARTICLE AND ARTICLE FORMED THEREBY

(75) Inventors: Paul Stephen Manicke, West Chester, OH (US); Bryant Edward Walker, Cincinnati, OH (US); Warren Rosal Ronk, West Chester, OH (US)

(73) Assignee: General Electric Company, Schenectady, NY (US)

( * ) Notice: Subject to any disclaimer, the term of this patent is extended or adjusted under 35 U.S.C. 154(b) by 950 days.

(21) Appl. No.: 12/827,821

(22) Filed: Jun. 30, 2010

(65) Prior Publication Data

US 2011/0150663 A1  Jun. 23, 2011

Related U.S. Application Data

(60) Provisional application No. 61/289,744, filed on Dec. 23, 2009.

(51) Int. Cl.
| | |
|---|---|
| C04B 35/573 | (2006.01) |
| C04B 35/634 | (2006.01) |
| F01D 5/12 | (2006.01) |
| C04B 35/626 | (2006.01) |
| C04B 35/80 | (2006.01) |
| C04B 35/632 | (2006.01) |

(52) U.S. Cl.
CPC .......... C04B 35/632 (2013.01); C04B 35/6269 (2013.01); C04B 35/63408 (2013.01); C04B 35/573 (2013.01); C04B 2235/422 (2013.01); C04B 35/63444 (2013.01); C04B 2235/5276 (2013.01); C04B 2235/5248 (2013.01); C04B 35/806 (2013.01); C04B 35/6263 (2013.01); C04B 35/6264 (2013.01); C04B 2235/425 (2013.01); C04B 35/6346 (2013.01); C04B 2235/5292 (2013.01)
USPC ........ 416/241 B; 264/29.1; 264/258; 264/294

(58) Field of Classification Search
USPC .......... 416/229 R, 229 A, 230, 241 A, 241 B; 264/29.1, 257, 258, 294
See application file for complete search history.

(56) References Cited

U.S. PATENT DOCUMENTS

| | | | |
|---|---|---|---|
| 4,546,674 A | 10/1985 | Clark et al. | |
| 5,015,540 A | 5/1991 | Borom et al. | |

(Continued)

FOREIGN PATENT DOCUMENTS

| | | |
|---|---|---|
| EP | 0933343 A1 | 8/1999 |
| EP | 1215183 A1 | 6/2002 |

(Continued)

OTHER PUBLICATIONS

EP Search Report issued in connection to related application EP Patent Application No. 10195942.7 filed on Dec. 20, 2010.

(Continued)

Primary Examiner — Edward Look
Assistant Examiner — Jesse Prager
(74) Attorney, Agent, or Firm — General Electric Company; Brian P. Overbeck

(57) ABSTRACT

Process for producing a ceramic composite structure includes impregnating a reinforcing material with a suitable precursor slurry composition including thermosetting resin, a suitable curing agent, a ceramic component, a carbonaceous solids component, and optionally, a suitable solvent. Exemplary thermosetting resins include polyesters, vinyl esters, epoxy resins, bismaleimide resins, and polyimide resins. The carbonaceous solids component provides a suitable amount of carbon char upon pyrolization. The preform may be dried prior to curing to remove solvents and thereby provide a working material comprising up to 70 volume % solids. The preform is cured, pyrolized, and infiltrated with molten silicon to form a composite article. The thermosetting resin is selected for processibility, green strength, and relatively fast cure cycle.

17 Claims, 2 Drawing Sheets

(56) References Cited

U.S. PATENT DOCUMENTS

| | | | |
|---|---|---|---|
| 5,294,460 A * | 3/1994 | Tani et al. | 427/228 |
| 5,330,854 A | 7/1994 | Sing et al. | |
| 5,336,350 A | 8/1994 | Sing | |
| 5,439,627 A * | 8/1995 | De Jager | 264/129 |
| 5,509,555 A | 4/1996 | Chiang et al. | |
| 5,730,915 A | 3/1998 | Cornie | |
| 5,840,221 A * | 11/1998 | Lau et al. | 264/29.7 |
| 6,024,898 A | 2/2000 | Steibel et al. | |
| 6,214,279 B1 * | 4/2001 | Yang et al. | 264/482 |
| 6,258,737 B1 | 7/2001 | Steibel et al. | |
| 6,280,550 B1 | 8/2001 | Steibel et al. | |
| 7,560,139 B2 | 7/2009 | Thebault et al. | |
| 2006/0081323 A1 | 4/2006 | Millerd et al. | |
| 2006/0219346 A1 | 10/2006 | Jander | |
| 2007/0082201 A1 | 4/2007 | Subramanian et al. | |
| 2007/0092762 A1 | 4/2007 | Corman et al. | |
| 2009/0169738 A1 | 7/2009 | Gray et al. | |
| 2009/0214845 A1 | 8/2009 | Corman et al. | |
| 2011/0151248 A1 | 6/2011 | Manicke et al. | |
| 2011/0268577 A1 * | 11/2011 | Bouillon et al. | 416/241 B |

FOREIGN PATENT DOCUMENTS

| | | |
|---|---|---|
| EP | 1524253 A1 | 4/2005 |
| EP | 1748036 A1 | 1/2007 |
| JP | 2000095573 | 4/2000 |
| JP | 20020378682 | 2/2002 |
| JP | 2004123529 A | 4/2004 |
| JP | 2007050705 A | 3/2007 |
| JP | 2009227565 A | 10/2009 |
| WO | 99/41440 A1 | 8/1999 |
| WO | 00/56811 A1 | 9/2000 |
| WO | 01/81270 A2 | 11/2001 |
| WO | 02/090291 A1 | 11/2002 |

OTHER PUBLICATIONS

Unofficial English Translation of Japanese Office Action issued in connection with corresponding JP Application No. 2010-283949 on Jun. 17, 2014.

* cited by examiner

PROCESS FOR PRODUCING A CERAMIC MATRIX COMPOSITE ARTICLE AND ARTICLE FORMED THEREBY

CROSS REFERENCE TO RELATED APPLICATIONS

This application claims priority and benefit of U.S. Provisional Patent Application Ser. No. 61/289,744 filed Dec. 23, 2009, the disclosure of which is incorporated herein by reference in its entirety.

BACKGROUND OF THE INVENTION

This invention relates generally to processes for producing ceramic matrix composite (CMC) articles and articles produced thereby, and more particularly to articles form from precursor slurry compositions comprising fast curing thermosetting resins.

CMC materials generally comprise a ceramic fiber reinforcement material embedded in a ceramic matrix material. The reinforcement material serves as the load-bearing constituent of the CMC in the event of a matrix crack, while the ceramic matrix protects the reinforcement material, maintains the orientation of its fibers, and serves to dissipate loads to the reinforcement material. Of particular interest to high-temperature applications are silicon-based composites, such as silicon carbide (SiC) as the matrix and/or reinforcement material. SiC fibers have been used as a reinforcement material for a variety of ceramic matrix materials, including SiC, TiC, Si3N4, and Al2O3.

One technique for fabricating CMCs involves multiple layers of "prepreg," often in the form of a tape-like structure, comprising the reinforcement material of the desired CMC impregnated with a precursor of the CMC matrix material. Prepregs may comprise a two-dimensional fiber array comprising a single layer of unidirectionally-aligned tows impregnated with a matrix precursor to create a generally two-dimensional laminate. Multiple plies of the resulting prepregs are stacked and debulked to form a laminate preform, a process referred to as "lay-up." The prepregs are typically arranged so that fiber tows of the prepreg layers are oriented transverse (e.g., perpendicular) to each other, providing greater strength in the laminate plane of the preform, corresponding to the principal or load-bearing direction of the final CMC component. Following lay-up, the laminate preform will typically undergo debulking and curing while subjected to applied pressure and an elevated temperature, such as in an autoclave.

The preform may be heated in vacuum or in an inert atmosphere in order to decompose the organic binders, at least one of which pyrolizes during this heat treatment to form a carbon char, and produces a porous preform for melt infiltration. During melt infiltration, molten silicon infiltrates into the porous preform, reacts with the carbon constituent of the matrix to form silicon carbide, and fills the porosity to yield the desired CMC component.

One process is described in U.S. Pat. Nos. 5,015,540; 5,330,854; and 5,336,550. As described therein, the reinforcing fibers in the preform are coated with a low char yield slurry composition containing polymers that decompose upon heating. The polymers produce little or no char, which means that there is little or no solid material after burnout, resulting in a low strength preform. Thus there is a need for an improved preform with high strength after burn-out.

In order to address the need for a stronger and tougher preform after burnout, U.S. Pat. No. 6,258,737 describes a process for forming a CMC article using a high char yielding resin slurry composition. Although operable, this disclosed process provides an opportunity for process and product improvement, especially for reduced cycle time and minimized solvent-induced defects.

BRIEF DESCRIPTION OF THE INVENTION

The above-mentioned need or needs may be met by exemplary embodiments which provide resin systems selected for processability and green strength. The selected resin systems greatly reduce the need for solvents and therefore solvent processing requirements. Exemplary embodiments employ solvents that are readily removed from the system. Exemplary embodiments utilize increased levels of organic binders or other fillers to provide the desired carbon char levels.

An exemplary process includes providing suitable reinforcing material; providing a precursor slurry composition including a thermosetting resin, a suitable curing agent, a ceramic component, a carbonaceous solids component, and optionally, a suitable solvent. Exemplary thermosetting resins include polyesters, vinyl esters, epoxy resins, bismaleimide resins, and polyimide resins. In an exemplary embodiment, the carbonaceous solids component provides a suitable amount of carbon char upon pyrolization. The reinforcing material is impregnated with the precursor slurry composition to form a working material which is dried to remove substantially all the solvent, if present. In an exemplary embodiment, the dried working material comprising up to about 70 volume % solids attributable to the ceramic component, a resin char, and the carbonaceous solids component.

Exemplary embodiments include article formed by the process set forth above.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
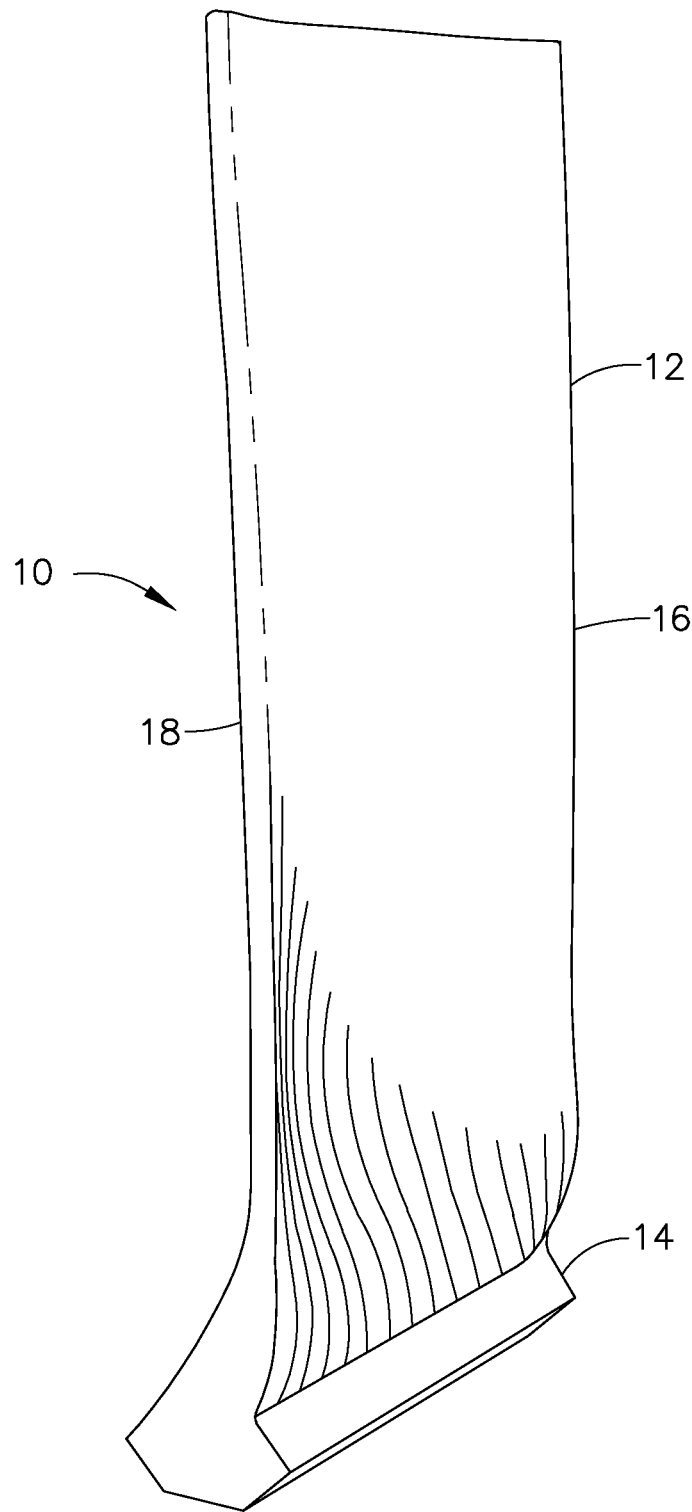
FIG. 1 is a perspective view of an exemplary CMC component.

Referring to the drawings, FIG. 1 shows an exemplary ceramic matrix composite component 10 particularly adapted for use in a gas turbine engine assembly. Component 10 includes an airfoil portion 12 against which a flow of gas is directed. The airfoil 10 is mounted to a disk (not shown) by a dovetail 14 that extends downwardly from the airfoil portion 12 and engages a slot of complimentary geometry on the disk. The airfoil has a leading edge section 18 and a trailing edge section 16. Such a composite airfoil is fabricated by laying up a plurality of plies. Those with skill in the art will readily appreciate that embodiments disclosed herein may be widely adapted to produce other ceramic matrix composite components.

Figure 2:
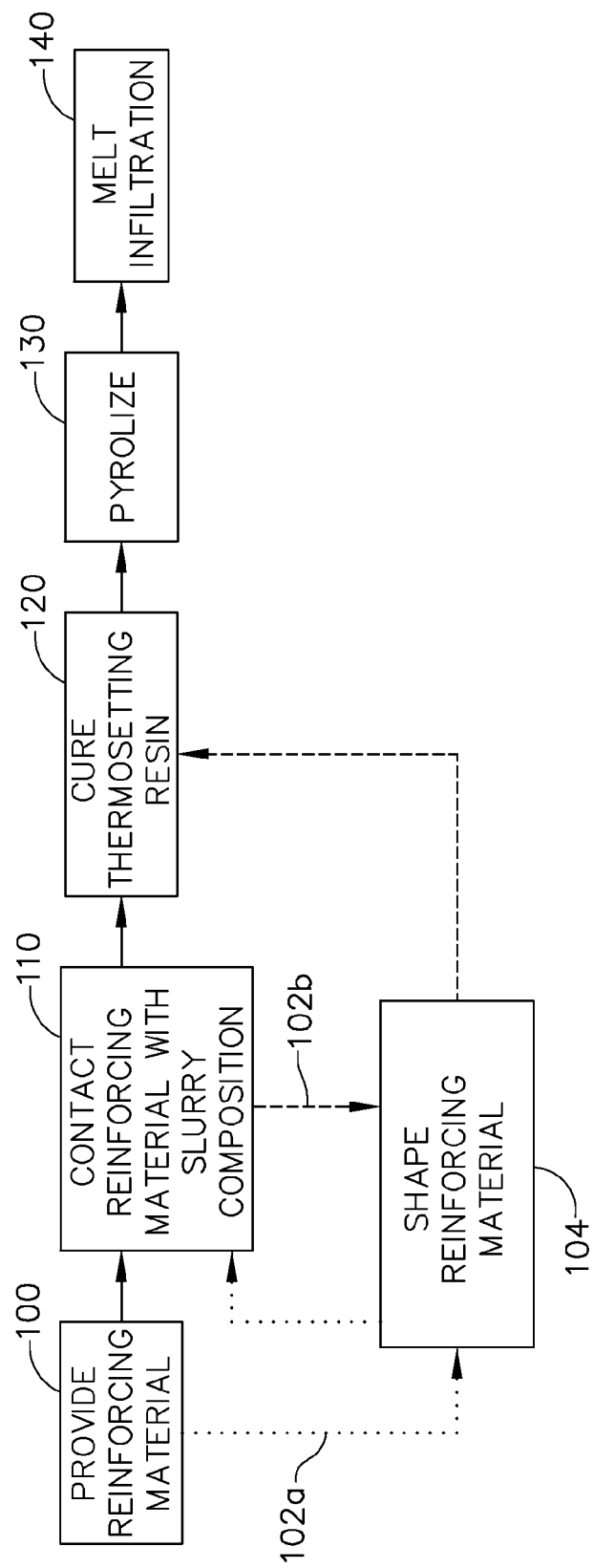
FIG. 2 is a flowchart of an exemplary process for forming a CMC article.

In an exemplary embodiment, composite component 10 may be formed by exemplary processes disclosed herein and schematically represented in FIG. 2. In an exemplary embodiment, reinforcing material such as silicon carbide-containing fibers may be provided (Step 100), for example, as bundled in tows. The reinforcing material may be formed into complex shapes to form the fiber preform which serves as a base for forming the final CMC article. As is known in the art, the fibers may be provided with boron nitride and/or other coating (e.g., silicon-wetting coatings). In an exemplary embodiment, the fibers may be characterized as "continuous lengths" meaning fiber lengths greater than or equal to 1 centimeter. Other exemplary embodiments may provide reinforcing material as non-continuous or chopped fibers. In other exemplary embodiments fiber tows may be directly laid up on tooling, for example in processes known in the art as filament winding. ideally In an exemplary embodiment, the reinforcing material is contacted with an exemplary slurry composition (Step 110). In certain exemplary embodiments, the reinforcing material is contacted with the slurry composition prior to shaping into a preform (Step 104), for example as a prepreg tape or laminate. In other exemplary embodiments, the reinforcing material may be initially shaped (Step 104) and then infused with an exemplary slurry composition. In other words, the reinforcing materials are contacted with an exemplary slurry composition either after being shaped into a preform, as indicated by the dotted line 102*a*, or before shaping indicated by dashed line 102*b*.

An exemplary slurry composition includes a fast-cure thermosetting resin system, which, after curing (Step 120), provides a cured preform having desired green strength and toughness. Further, the thermosetting resin system may be selected to require minimal solvent additions that must be removed during cure. The thermosetting resin system may be selected to cure very quickly, as compared to other resin systems currently used in forming CMC components. In an exemplary embodiment, the resin system may cure in less than 15 minutes, for example, 7-10 minutes, with substantially all the solvent, if used, being removed before cure. The reduced solvent provides opportunities for improved dimensional control, especially when forming high tolerance components, e.g., turbine blades and shrouds. An additional advantage of the exemplary thermosetting resin systems is the opportunity to use closed die molding techniques due to more constant volume. The quick cure cycles provides fast turn around times on the molding equipment. Additionally, reduced solvent loads result in lower bulk so that during the shaping/molding process there is reduced opportunities for slips or wrinkles, resulting in improved repeatability.

Exemplary resins are polyesters, vinyl esters, epoxy resins, or other fast-curing thermosetting resins. An exemplary slurry composition includes a polyester resin, a suitable curing agent (e.g., benzoyl peroxide), a ceramic component (e.g., SiC), and a carbonaceous solids component including organic binders or other fillers. The carbon filler loading is generally higher than a level used in the high char resin systems referenced above in order to achieve a comparable carbon yield. For example, carbon-containing fillers in known high char resin systems may be about 27 volume %. In exemplary embodiments disclosed herein, preforms, prior to cure, may include carbon fillers at levels up to about 60-70 volume % by utilizing solvent (e.g., acetone) prior to shaping and removing the solvent prior to cure. Other exemplary embodiments may include the carbonaceous solids component at levels greater than about 30 volume %. Exemplary carbonaceous material may include graphite particles, flakes, whiskers, or fibers of amorphous, single crystal or poly-crystalline carbon, carbonized plant fibers, lamp lack, finely divided coal, charcoal, and carbonized polymer fibers or felt such as rayon poly-acrylonitrile, and polyacetylene. Ideally, the resin(s) provide adequate flow without requiring significant amount of solvent.

"Adequate flow" may be determined by the processing requirements such as the flow required to consolidate the resin system during the cure stage. Other processing methods, such as mixing the slurry to a homogenous mixture or winding into a tape may require lower viscosity than consolidation. Those with skill in the art will appreciate the flow requirements for the desired outcomes. Exemplary embodiments may include acetone or other easily removed solvent. Benzoyl peroxide or other agents may be utilized to initiate polymerization of the resin(s).

Exemplary embodiments may include acetone or other easily removed solvent. Benzoyl peroxide or other agents may be utilized to initiate polymerization of the resin(s).

Removal of substantially all the solvent, if used, prior to cure, and use of a relatively fast curing thermosetting resin promotes substantially total cure, providing dimensional stability to the preform. The cured preform is pyrolized (Step 130) as is known in the art to yield a porous fiber structure for subsequent processing. Pyrolization yields carbon content for subsequent reaction with molten silicon to form the silicon-silicon carbide composite.

An exemplary melt infiltration process (Step 140) is disclosed in U.S. Pat. No. 4,737,328, which is incorporated herein by reference. Sufficient molten silicon infiltrate is infiltrated into the preform to produce the composite component. Specifically, the molten silicon infiltrant is mobile and highly reactive with elemental carbon to form silicon carbide. The period of time required for infiltration may be determined empirically and depends largely on the size of the preform and extent of infiltration required. Thereafter, the resulting infiltrated body is cooled under conditions (atmosphere and cooling rate) to avoid significant deleterious effects. It is envisioned that pyrolization and silicon melt infiltration may be performed in a continuous operation, or in separate operations as understood by those having skill in the art.

The temperature range for melt infiltration may be from about 1400° C. to about 1800° C., preferably between about 1400° C. and 1450° C. The preform may be placed on a carbon wick that is supported on a boron-nitride coated graphite plate. Silicon (e.g., as 95% Si-5% B alloy) may be placed on the wick in an amount sufficient to completely saturate the wick and fill the preform when molten.

After cooling, the infiltrated composite body may be removed from the attached carbon wick (largely converted to silicon carbide and silicon) by known techniques such as cutting and grinding with diamond abrasive wheels. Exemplary composite bodies have high density (e.g., not greater than about 3% porosity).

Thus, there is provided a process for quickly forming a porous preform having sufficient residual carbon char and reinforcement material into which molten Si may be infused to form the SiC matrix. The porous preform may comprise a near net shape incorporating complex features not readily obtainable by prior methods.

In an alternate embodiment, a sheet molding compound is disclosed. An exemplary sheet molding compound includes reinforcing material of randomly dispersed chopped fibers, for example chopped coated SiC tow bundles typically about 1-5 cm in length, sandwiched between opposing films of the ceramic precursor slurry (i.e., the thermosetting resin system as discussed above). The fast curing thermosetting resin is used to obtain both flow in the mold and green strength after molding but prior to pyrolization. The CMC precursor sheet molding compound can be subsequently processed to suitable green strength, for example, by compression molding. The thicker final form of the CMC sheet molding compound material along with the material's ability to flow and crosslink can reduce CMC component processing time by several hours.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A process comprising:
   providing a reinforcing material;
   providing a precursor slurry composition including a thermosetting resin, a curing agent, a ceramic component, a carbonaceous solids component that includes at least a carbon-containing filler, and optionally a solvent, wherein the thermosetting resin is at least one member selected from a polyester, a vinyl ester, and a bismaleimide resin, wherein the thermosetting resin and the curing agent are present in the precursor slurry composition to yield a cure time of less than fifteen minutes, wherein the thermosetting resin forms carbon char upon pyrolization, and wherein the carbon char and the filler of the carbonaceous solids component provide a final carbon yield;
   impregnating the reinforcing material with the precursor slurry composition to form a working material;
   drying the working material to remove substantially all the solvent, if present, wherein the dried working material comprises greater than 30 volume % to about 70 volume % solids attributable to the carbonaceous solids component.

2. The process according to claim 1 further comprising:
   shaping the working material into a near net shape preform subsequent to or prior to drying the working material.

3. The process according to claim 2 further comprising:
   curing the thermosetting resin in the near net shape preform to provide a cured preform.

4. The process according to claim 3 further comprising:
   pyrolyzing the cured preform to produce the carbon char and form a porous preform; and
   infiltrating the porous preform with molten silicon to form a ceramic composite structure.

5. The process according to claim 1 wherein providing the precursor slurry composition includes providing about 48 volume % acetone as the solvent, about 16 volume % of the carbonaceous solids component; about 9 volume % of the ceramic component, a remainder being the thermosetting resin and the curing agent.

6. The process according to claim 1 wherein the working material comprises a unidirectional tape.

7. The process according to claim 1 wherein providing the precursor slurry composition includes providing an amount of one or more additives selected from dispersants, thickening agents, crosslinking monomers, low profile additives and pigments.

8. The process according to claim 1 wherein flow of the precursor slurry composition is obtained with the thermosetting resin.

9. The process according to claim 1 wherein the carbonaceous solids component includes at least one member of the group consisting of graphite particles, graphite flakes, graphite whiskers, amorphous, single crystal or poly-crystalline carbon, carbonized plant fibers, lamp black, finely divided coal, charcoal, carbonized polymer fibers or felt.

10. The process according to claim 2 wherein shaping the working material includes forming a plurality of prepreg plies.

11. The process according to claim 10 wherein the working material is dried prior to forming the prepreg plies.

12. The process according to claim 11 further comprising:
    stacking the prepreg plies to provide an uncured ply stack;
    covering each of the outer plies of the stack with a covering ply formed of a matrix material including the thermosetting resin and the curing agent; and
    press curing the stack for a total cure time of less than 15 minutes;
    pyrolozing the cured stack to produce the carbon char and form a porous preform; and
    infiltrating the porous preform with molten silicon to form a ceramic composite structure.

13. An article comprising:
    a ceramic composite structure derived from the process according to claim 1.

14. The article according to claim 13 comprising a blade for a gas turbine engine assembly.

15. The process according to claim 1, wherein the thermosetting resin is polyester.

16. The process according to claim 1, wherein the thermosetting resin is vinyl ester.

17. The process according to claim 1, wherein the precursor slurry composition does not contain a solvent.

* * * * *